May 30, 1967   K. H. MINDRUM   3,322,454
CONTROL VALVE FOR VACUUM LIFT DEVICE
Filed Aug. 18, 1965   2 Sheets-Sheet 1
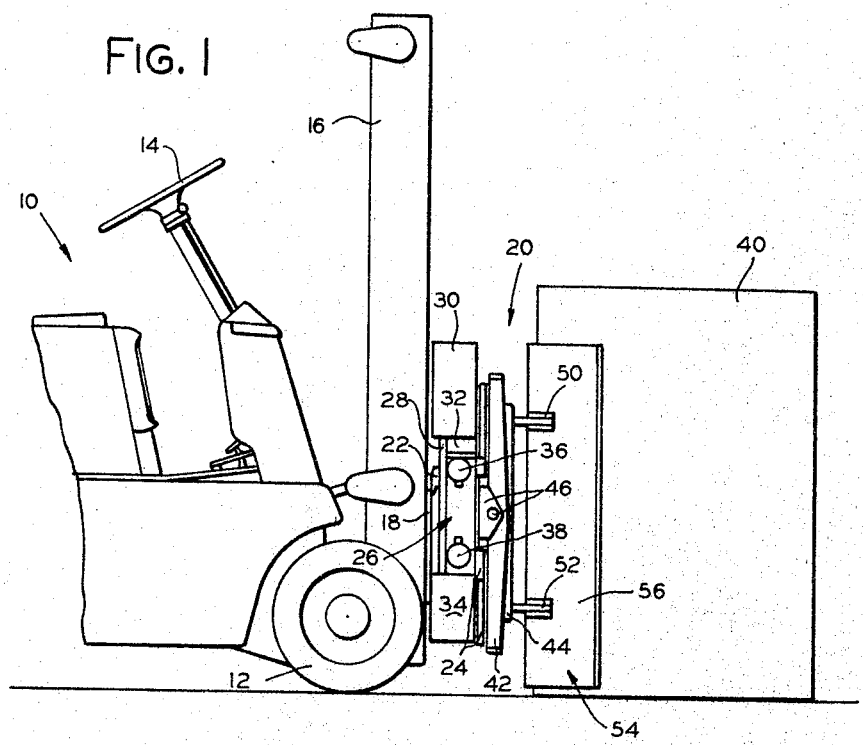
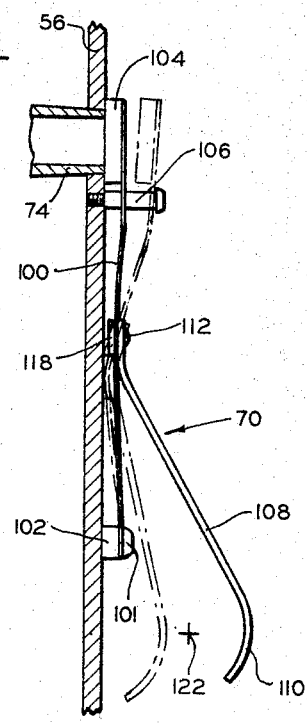
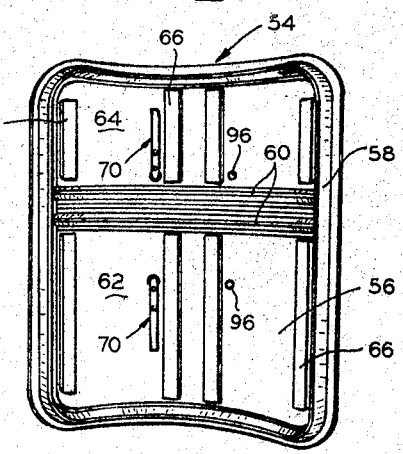
INVENTOR
KENNETH H. MINDRUM
BY
ATTORNEY May 30, 1967    K. H. MINDRUM    3,322,454
CONTROL VALVE FOR VACUUM LIFT DEVICE Filed Aug. 18, 1965    2 Sheets-Sheet 2

INVENTOR
KENNETH H. MINDRUM
BY
*J. P. Wiesler*
ATTORNEY

United States Patent Office 3,322,454
Patented May 30, 1967

3,322,454
CONTROL VALVE FOR VACUUM LIFT DEVICE
Kenneth H. Mindrum, Battle Creek, Mich., assignor to Clark Equipment Company, a corporation of Michigan
Filed Aug. 18, 1965, Ser. No. 480,651
7 Claims. (Cl. 294—64)

This invention relates to an industrial truck, and more particularly to an article handling attachment for an industrial truck utilizing vacuum equipment for lifting and transporting articles.

In copending application Ser. No. 333,870, filed Dec. 27, 1963, in the name of Marshall Sawdey (common assignee), is disclosed an improved vacuum load handling attachment capable of articulated adjustment in a plurality of different planes so as to minimize the necessity of maneuvering the vehicle with which the attachment is associated during load engaging operations. Various constructions of vacuum operated lifting devices appear in the art to which the present invention pertains, in all of which devices special valving means must be provided in order to control the period of time during which evacuation of one or more load handling chambers of the attachment is effective, particularly with respect to the control of the time of initiation of evacuation. It has been a common fault of prior vacuum control valves of the type contemplated to effect a more or less gradual application of vacuum in the chambers to be evacuated during load engaging operation. This is undesirable both from the standpoint of the resulting "gradual" conneciton of the attachment device to the article to be engaged, and the impositive "feel" of the operator with respect to when the article is fully engaged and ready for lifting.

I have devised a mechanically actuated, extremely simple and low cost snap-acting valve device which does not open the vacuum port which communicates the chambers to be evacuated with the vacuum pump until such time as a fully sealed condition exists between the surface of the article to be engaged and the sealing means of the attachment. When such fully sealed condition exists the valve snaps open so that full vacuum is applied substantially instantaneously to said chambers, thereby avoiding the above-mentioned functional defect of prior control valves in such devices.

It is therefore an object of the present invention to provide an improved vacuum control valve for devices of the type contemplated.

It is another object of the invention to provide a control valve for a vacuum attachment of a load handling vehicle which operates in such a manner as to insure fast-acting full engagement of an article by the load engaging device when the valve is actuated.

Another object of the invention is to provide a spring operated vacuum control valve which opens suddenly following a predetermined deflection of the spring.

Additional objects and advantages of the invention will become apparent from the following description and accompanying drawings, wherein:

FIGURE 1 is a side elevational view of an industrial truck and vacuum operated article handling attachment of a type typical of those with which my invention may be used;

FIGURE 2 is a front elevational view of the article engaging member of the attachment;

FIGURE 4 is an enlarged, broken-away cross-sectional view of a portion of the attachment device showing the details of the vacuum control valve.

Figure 3:
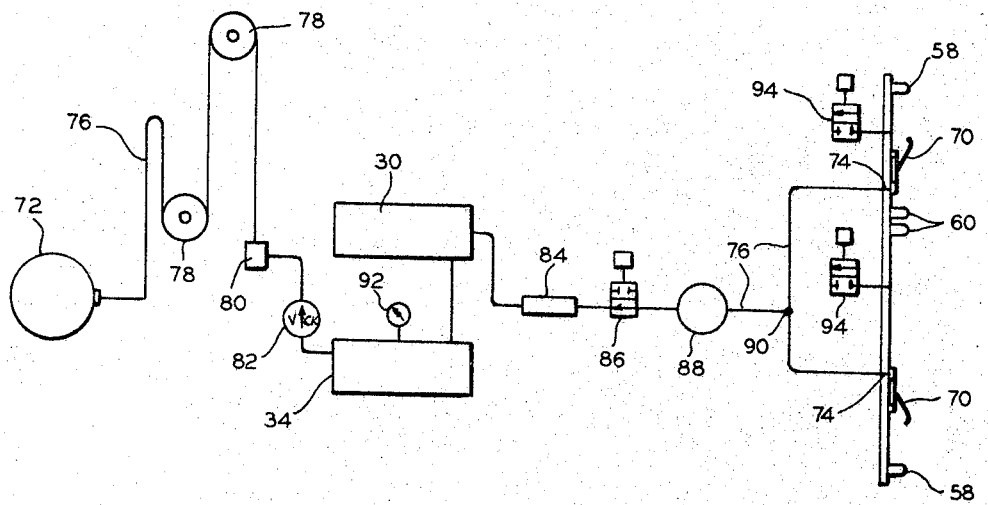
FIGURE 3 is a schematic view of the vacuum system of the present invention.
Figure 5:
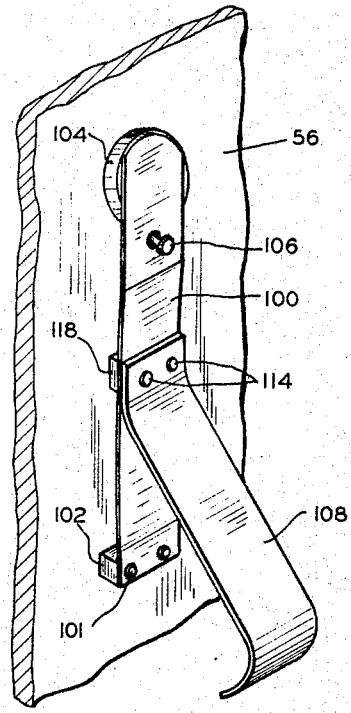
FIGURE 5 is a broken-away perspective view of the control valve shown in FIG. 4.

Referring now in detail to the drawings, numeral 10 designates the forward portion of an industrial lift truck having a pair of front wheels 12, a steering mechanism 14, a tiltable upright construction 16 of known construction mounted at the lower end thereof on the drive axle for the wheels 12, and a carriage mechanism 18 roller mounted on the upright 16 in known manner for elevation relative thereto and on which is mounted vacuum attachment apparatus which includes the control valve of the present invention.

Attachment 20 is mounted upon carriage 18 by conventional brackets 22. A turntable support plate 24 is preferably mounted for rotation through 180° by an actuating mechanism indicated generally at 26, located intermediate support plate 24 and a support plate 28 to which brackets 22 are secured. An upper vacuum reserve tank 30 is mounted upon plate 28 on a transverse support member 32 secured thereto. A lower vacuum reserve tank 34 is also secured to plate 28. A suitable mechanism for rotating plate 24 is described and claimed in Patent No. 3,198,023 granted Aug. 3, 1965. It consists generally of a pair of double-acting hydraulic cylinders 36 and 38 each having a piston therein with a rack on the inner edge for engaging the teeth on a pinion, not shown, so that movement of the pistons in opposite directions in one sense rotates the pinion, which is rigidly secured to plate 24 by a ring of bolts, and thus rotates the plate 24 to various angular positions as required for rotational positioning of the paper roll 40. Supported upon rotator plate 24 is a plural articulated mounting frame assembly 42 and 44, frame 42 of which is mounted for pivotal movement about central horizontal pivot means 46, and pivot frame 44 of which is nested within frame 42 and is mounted to pivot about upper and lower vertical pivot members, not shown, which connect frame 44 to frame 42. The constructional details of the plural articulated frame mounting, and the connection thereof to rotator means 26 are disclosed in detail in the aforementioned co-pending application, and need not be disclosed in further detail in the present application inasmuch as the structure thus far described in general terms forms no part of the present invention.

Suitably secured to the inner articulated frame 44 by arm and bracket members 50 and 52, which are located in transversely spaced upper and lower pairs, is an article or roll engaging assembly 54. Article engaging assembly 54 is constructed of a rigid support plate 56 having a predetermined curvature to accommodate a roll of predetermined diameter by engagement in sealing relationship with a portion of the surface of the roll, as shown in FIG. 1.

Normally in practice the roll engaging member of such vacuum handling equipment as is herein contemplated is capable of adjustment within a predetermined range so that it can accommodate rolls which vary in diameter within said range. One method of providing for such adjustment is illustrated in the aforementioned co-pending application wherein a plurality of independent curved roll engaging pad members are mounted for independent pivotal movement on an articulated frame assembly such as assembly 42 and 44 of the present application. Another construction for accommodating rolls which vary in diameter is illustrated in co-pending application Ser. No. 477,276, filed Aug. 4, 1965, which utilizes a flexible roll engaging member, and yet another means for adjustment is illustrated in co-pending application Ser. No. 476,966, filed Aug. 3, 1965 (both assigned to the assignee of the present application). Other means for providing such adjustability are available, and the control valve of the present invention is readily adapted to be utilized with any such constructions. Inasmuch as the present invention is not necessarily related to an adjustable construction of the load engaging member per se, a non-adjustable member 54 is illustrated herein in order to simplify the disclosure.

As disclosed, roll engaging member 54 has secured to curved plate 56 a flexible sealing member 58 which extends around the entire periphery of the inner or concave curved surface of plate 56, and a pair of spaced flexible sealing members 60 which extend from one side of the plate member to the other along the inner curved surface thereof to form with sealing member 58 a pair of independently sealable chambers 62 and 64 in the lower and upper portions of member 56 as viewed in FIG. 2. Pairs of vertically extending friction bars 66 are suitably located within chambers 62 and 64 for frictionally engaging the side surface of rolls to be engaged and transported, although the use of such friction bars is optional. Mounted in each of chambers 62 and 64 is the vacuum control valve assembly 70 of the present invention, it being understood that one or any number of such control valves can be used in conjunction with each article engaging assembly, depending upon the number of sealable chambers which may be required in different applications, and that the use of such control valves in roll engaging devices of the type disclosed herein is merely exemplary of one application of the invention, inasmuch as the principle of the present control valve construction is applicable to various configurations of articles to be handled.

An exemplary vacuum system is shown schematically in FIG. 3 for use with the lift truck and attachment of FIG. 1. A vacuum pump 72 is connected to ports 74 in chambers 62 and 64 by a flexible conduit 76 which is reeved over suitably located sheaves 78 adapted to be mounted on upright 16 for providing proper conduit take-up movement during up and down movements of the attachment device relative to the upright. The conduit 76 is connected to a swivel 80, a ball check valve 82, the lower vacuum reserve tank 34, the upper reserve tank 30, a spindle 84 located within the rotatable portion of the attachment, a normally open solenoid valve 86, a filter 88, and a T-connection 90 at which the conduit 76 divides for connection to both ports 74 in chambers 62 and 64. A vacuum gage 92 is connected to the lower vacuum reserve tank and its preferably mounted upon the operator's instrument panel. A pair of normally closed solenoid valves 94 are adapted to communicate with the respective vacuum chambers 62 and 64 and are suitably electrically connected with solenoid valve 86 so that when the latter valve is open and the vacuum pump energized, both valves 94 are closed to a pair of ports 96 in chambers 62 and 64 to prevent communication of said chambers with the atmosphere through said ports 96 and valves 94. Disengagement of an article, such as roll 40, from the attachment may be effected by operating solenoid 86 to a closed position, which automatically operates valves 94 to open and communicate chambers 62 and 64 with the atmosphere thereby effecting almost instantaneous disengagement of the roll from its vacuum engagement with the attachment device.

My invention resides primarily in the construction and operation of control valve 70; it comprises a generally flat leaf spring or equivalent member 100 secured at its one end to plate member 56 by a pair of screws or studs 101 and a spacer element 102, and secured at its opposite end to a flat disc-shaped valve element 104 which is adapted to open and close the adjacent port 74 in a manner to be described. A stud 106 is secured to plate member 56 and extends through a slot in spring member 100. An enlarged end of the stud 106 functions as a stop to limit movement in an opening direction of the valve element 104. A cantilevered spring member 108 having an inwardly curver outer end 110 and a flat opposite end 112 is secured to spring member 100 approximately at the longitudinal center thereof by a pair of rivets or studs 114 secured also to a reinforcing element 118. When vacuum pump 72 is in operation and solenoid valve 86 is open the vacuum system illustrated in FIG. 3 produces substantial suction at each of ports 74, and so long as the outer side of valve pad 104 is subjected to atmospheric pressure, the valve is maintained in a closed position on valve port 74 by the resulting force differential acting on valve element 104.

In operation, when it is desired to engage, lift and transport a roll 40, the truck 10 is driven into the position illustrated in FIG. 1 such that plate member 56 and seals 58 and 60 adjust to the surface curvature of the roll by means of the plural articulation of frames 42 and 44, whereupon seals 58 and 60 are compressed into full sealing relationship with the surface of the roll as the truck moves the attachment into forceful engagement with the roll. Spring element 108 projects a predetermined distance outwardly of plate 56 so that end portion 110 thereof contacts the surface of the roll at about the same time as seal members 58 and 60 first contact said surface. Thus, spring element 108 is actuated inwardly toward plate member 56 as the seal members are compressed against the surface of the roll to form an air-tight seal therewith. The suction force acting upon valve element 104 holds the valve pad closed on port 74 until spring element 108 is actuated a predetermined distance inwardly toward plate member 56, during which actuation spring element 108 produces a force couple at its connection 112 to leaf spring 100 which bends that portion of spring element 100 which is located toward the secured end 102 toward plate member 56, and bends the opposite end portion away from plate member 56. When the force couple produced by inward movement of spring element 108 is sufficient to overcome the vacuum force holding valve pad 104 closed, the valve pad pops open suddenly and spring element 108 is actuated further inwardly so that the control valve assembly assumes a position approximating that illustrated in broken lines in FIG. 4. The enlarged outer end of stud 106 functions as a stop to eliminate excess opening movement of the valve end of spring 100.

The control valve 70 may, of course, be constructed in accordance with any required design criteria. For instance, in the present design operating under normal full vacuum conditons at port 74 and with a predetermined depth or thickness of seals 58 and 60, valve 70 is designed so that the force couple imposed on spring element 100 pops open valve pad 104 when spring element 108 is depressed to the position indicated at 122. Variations in the design of the valve may be made to suit requirements.

When it is desired to disengage a roll, the roll is deposited on a floor or other platform and valve 86 actuated to a closed position, which effects actuation of solenoid valves 94 to open positions, whereby chambers 62 and 64 are vented to the atmosphere and the roll is immediately disengaged.

It will now be appreciated that I have provided a snap-acting vacuum control valve for use in devices of the type contemplated which effects the instantaneous application of full vacuum to chambers formed between the article to be transported and the handling device only after the device has effected a full sealing engagement with the article, and that this desirable result is effected by means of an extremely simple, low cost, and foolproof control valve construction.

Although I have described and illustrated a preferred embodiment of my invention, it will be understood by those skilled in the art that modifications may be made in the structure, form and relative arrangement of parts without departing from the spirit and scope of the invention. Accordingly, it should be understood that I intend to cover by the appended claims all such modifications which fall within the scope of my invention.

I claim:

1. A vacuum actuated article handling device comprising load engaging means, flexible sealing means secured to said load engaging means and forming therewith a chamber which is adapted to be sealed from the atmosphere when the sealing means is moved into sealing relationship with the article to be engaged, a valve port opening into said chamber, vacuum producing means connected to said port, and control valve means for opening and closing said port, said control valve means including a valve element adapted to be held in a port closing position with a force which is proportional to the vacuum at said port and spring means connected to said valve element deflectible by an article engaged by the load engaging means to impose a valve opening force on the valve element, said valve element snap-opening at a certain deflection of said spring means to communicate substantially full port vacuum substantially instantaneously to said chamber upon or following sealing of the chamber from the atmosphere by said sealing means.

2. A device as claimed in claim 1 wherein said spring means comprises an elongated spring element secured to the load engaging means and connected to the valve element, and a cantilever spring element secured intermediate the ends of said elongated spring element and extending outwardly of the load engaging means from said connection.

3. A device as claimed in claim 2 wherein said cantilever spring element contacts the side of an article engaged and is actuated toward the load engaging means during compression of the sealing means, said deflection producing a force on said elongated spring element in a valve opening direction opposing the vacuum force at the valve port to effect a snap-opening action of the valve element.

4. An attachment for a lift truck comprising load engagin means mounted on the truck, sealing means secured to said load engaging means and forming therewith a chamber sealable from the atmosphere, a valve port in said load engaging means opening into said chamber, means for producing vacuum at said valve port, and control valve means for opening and closing said port, said control valve means including a valve element closing said port with a force which is a function of the vacuum at said port and means connected to said valve element deflectible by an article engaged by the load engaging means to actuate said valve element open to communicate said port with said chamber, said deflectible means imposing a force upon said valve element to produce snap-opening movement thereof at such time as said latter force exceeds the vacuum force holding the valve element closed.

5. Load engaging means forming a vacuum chamber, a vacuum port in said load engaging means adapted to communicate with said chamber, and control valve means controlling communication between said port and chamber comprising a valve element normally closing said port with a force which varies with the vacuum in said port, elongated spring means connected to the valve element and to the load engaging means, a cantilevered spring means connected intermediate the ends of the elongated spring means extending into said chamber, said cantilevered spring means being actuatable to produce a force upon said elongated spring means which tends to actuate the valve element in a direction opening the valve port, said elongated and cantilevered spring means cooperating to produce a snap-opening movement of the valve element relative to the valve port.

6. A device as claimed in claim 5 wherein said load engaging means includes flexible sealing means extending peripherally of said chamber and movable into sealing relation with a portion of an article to be engaged, said vacuum chamber being formed between the article engaged and said load engaging means, and control valve means snap-opening following sealing engagement of said sealing means with the article engaged for producing full vacuum in said chamber.

7. A vacuum actuated article handling device comprising load engaging means, flexible sealing means secured to the load engaging means and forming therewith a chamber which is adapted to be sealed from the atmosphere when the sealing means is moved into compressed sealing relation with an article to be engaged, a valve port opening into said chamber, vacuum producing means connected to said port, and control valve means for opening and closing said port, said control valve means including a valve element adapted to be held in a port closing position with a force which varies with the vacuum at said port and spring means connected to said valve element, said spring means including a cantilevered spring element extending into said chamber and deflectible by an article engaged by the load engaging means to impose a valve opening force on the valve element, deflection of said cantilevered spring element occurring during compression of said sealing means by the article engaged as the load engaging means is moved forcibly into engagement with said article, said cantilevered spring element causing the valve element to open the valve port with snap-action when the valve opening spring force exceeds the valve holding vacuum force.

References Cited
UNITED STATES PATENTS 2,578,220 12/1951 Billner _____ 294—65
3,089,723 5/1963 Fortson _____ 294—65

FOREIGN PATENTS 1,252,014 12/1960 France.

GERALD M. FORLENZA, Primary Examiner.

G. F. ABRAHAM, Assistant Examiner.